(12) United States Patent
Uraizee et al.

(10) Patent No.: US 10,389,663 B2
(45) Date of Patent: Aug. 20, 2019

(54) AUTOMATIC UPLOADING OF ATTACHMENTS TO GROUP CLOUD STORAGE AT SEND TIME

(71) Applicant: MICROSOFT TECHNOLOGY LICENSING, LLC, Redmond, WA (US)

(72) Inventors: Misbah Uraizee, Bellevue, WA (US); George Arthur Herbert, III, Kirkland, WA (US); Christopher Walker, Redmond, WA (US); Aaron Stolarz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 14/846,195

(22) Filed: Sep. 4, 2015

(65) Prior Publication Data

US 2016/0315887 A1 Oct. 27, 2016

Related U.S. Application Data

(60) Provisional application No. 62/151,881, filed on Apr. 23, 2015.

(51) Int. Cl.
*H04L 12/58* (2006.01)
*H04L 29/08* (2006.01)
*H04L 29/06* (2006.01)

(52) U.S. Cl.
CPC ............. *H04L 51/08* (2013.01); *H04L 51/36* (2013.01); *H04L 63/105* (2013.01); *H04L 67/10* (2013.01);

(Continued)

(58) Field of Classification Search
None
See application file for complete search history.

(56) References Cited

U.S. PATENT DOCUMENTS 6,505,236 B1  1/2003 Pollack
6,687,741 B1  2/2004 Ramaley et al.
(Continued)

FOREIGN PATENT DOCUMENTS

CN      102685240 A      9/2012

OTHER PUBLICATIONS

"Insert files using Google Drive in Gmail", Published on: Apr. 14, 2013, Available at: https://support.google.com/mail/answer/2480713?hl=en.

(Continued)

*Primary Examiner* — Viet D Vu
*Assistant Examiner* — James A Edwards
(74) *Attorney, Agent, or Firm* — Michael Best & Friedrich LLP (57) ABSTRACT

Technologies are presented directed to uploading of attachments to a relevant group cloud storage at send time. A communication application and/or service may suggest to a user to upload an attachment of an outgoing communication to a group cloud storage upon generation of the communication. Suggestion of group may be based on last use, document type, content, user(s), which account the user is in, and comparable factors. The user (or sender) may also be provided with options to set permissions for the attachment based on the upload destination selection. In some examples, upload of work documents to personal cloud storage may be prevented and suitable groups may be selected for user that are part of multiple groups.

16 Claims, 9 Drawing Sheets

(52) U.S. Cl.
CPC ........ *H04L 67/1097* (2013.01); *H04L 67/306* (2013.01); *H04L 51/00* (2013.01)

(56) References Cited

U.S. PATENT DOCUMENTS

| | | | |
|---|---|---|---|
| 8,527,549 | B2 | 9/2013 | Cidon |
| 8,719,325 | B2 | 5/2014 | Edelstein et al. |
| 8,943,315 | B1 | 1/2015 | Ubl |
| 10,037,352 | B1* | 7/2018 | Dyer ................. G06F 17/30221 |
| 2004/0158607 | A1 | 8/2004 | Coppinger et al. |
| 2010/0082713 | A1 | 4/2010 | Frid-Nielsen et al. |
| 2011/0184998 | A1 | 7/2011 | Palahnuk et al. |
| 2011/0276538 | A1 | 11/2011 | Knapp et al. |
| 2012/0030318 | A1* | 2/2012 | Ryder ................. H04L 67/1095 709/220 |
| 2012/0278404 | A1* | 11/2012 | Meisels ................ G06Q 10/107 709/206 |
| 2012/0278405 | A1* | 11/2012 | Costenaro ........... H04L 67/2857 709/206 |
| 2013/0198304 | A1 | 8/2013 | Jung |
| 2013/0238572 | A1* | 9/2013 | Prahlad ............. G06F 17/30082 707/692 |
| 2013/0275509 | A1 | 10/2013 | Micucci et al. |
| 2013/0346509 | A1* | 12/2013 | Elkins ................... G06Q 50/32 709/206 |
| 2014/0019498 | A1 | 1/2014 | Cidon et al. |
| 2014/0164534 | A1 | 6/2014 | Fushman et al. |
| 2014/0214984 | A1* | 7/2014 | Lee ....................... H04L 51/063 709/206 |
| 2014/0279846 | A1 | 9/2014 | Srinivasan et al. |
| 2015/0127936 | A1* | 5/2015 | Kim .................... H04L 63/0428 713/164 |
| 2015/0134817 | A1* | 5/2015 | Edwards ................. H04L 47/70 709/225 |
| 2015/0169599 | A1* | 6/2015 | Burnett .................. H04L 51/08 707/662 |
| 2015/0370827 | A1* | 12/2015 | Parkison ........... G06F 17/30215 707/626 |
| 2016/0142350 | A1* | 5/2016 | Mutha .................... H04L 51/08 709/206 |

OTHER PUBLICATIONS

"International Preliminary Report on Patentability Issued in PCT Application No. PCT/US2016/027478", dated Mar. 14, 2017, 6 Pages.

"International Search Report and Written Opinion Issued in PCT Application No. PCT/US2016/027478", dated Jul. 25, 2016, 12 Pages.

* cited by examiner

AUTOMATIC UPLOADING OF ATTACHMENTS TO GROUP CLOUD STORAGE AT SEND TIME

CROSS-REFERENCE TO RELATED APPLICATIONS

This Application claims the benefit under 35 U.S.C. § 119(e) of U.S. Provisional Patent Application Ser. No. 62/151,881 filed Apr. 23, 2015. The disclosure of the U.S. Provisional Patent Application is hereby incorporated by reference in its entirety.

BACKGROUND

Some communication applications such as email applications may provide rich attachment capabilities, where physical or cloud-based attachments can be sent/displayed along with metadata that may be live. While cloud-based attachments provide many advantages such as reduced networked bandwidth usage, collaboration enhancement through most up-to-date version being shared, etc., users are still capable of and may continue out of habit to attach physical files from their local storage and exchange via email or similar communication modes. This defeats the purpose of using cloud-based storage for collaborative environments.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to uploading of attachments to a group cloud storage at send time. Inclusion of an attachment may be detected in an outgoing communication. A relevant group cloud storage associated with the attachment may be determined and a suggestion may be presented to a sender based on the determination. The attachment may be uploaded to the determined group cloud storage, and the outgoing communication transmitted with the attachment.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, attachments may be uploaded to a relevant group cloud storage at send time. A communication application and/or service may suggest to a user to upload an attachment of an outgoing communication to a group cloud storage upon generation of the communication. Suggestion of group may be based on last use, document type, content, user(s), which account the user is in, and comparable factors. The user (or sender) may also be provided with options to set permissions for the attachment based on the upload destination selection. In some examples, upload of work documents to personal cloud storage may be prevented and suitable groups may be selected for user that are part of multiple groups.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing communication services including emits and exchange of attachments. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, anon-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

While example implementations are described using emails herein, embodiments are not limited to entails. Uploading of attachments to a relevant group cloud storage at send time may be implemented in other communication types such as instant messages, data sharing, application sharing, online conferencing, and similar communications, where files or objects may be exchanged as attachment with the communication.

An attachment as used herein refers to any file or object that is included with a communication such as an email, where the file or object may be attached as a separate entity to the communication, inserted into a body of the communication as a file or object, or provided along with the communication as a link to the file or object. The attachment may include features such as interactivity, preview, presence, dynamic content update, and other non-static capabilities.

The technical advantages of providing uploading of attachments to group cloud storage at send time may include increased efficiency in network usage (reduced communication traffic), reduced data storage demand (avoidance of local file storage), improved user efficiency (availability of latest versions of attachments through the cloud version), and improved user interaction with user interfaces.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with attachments.

Figure 1:
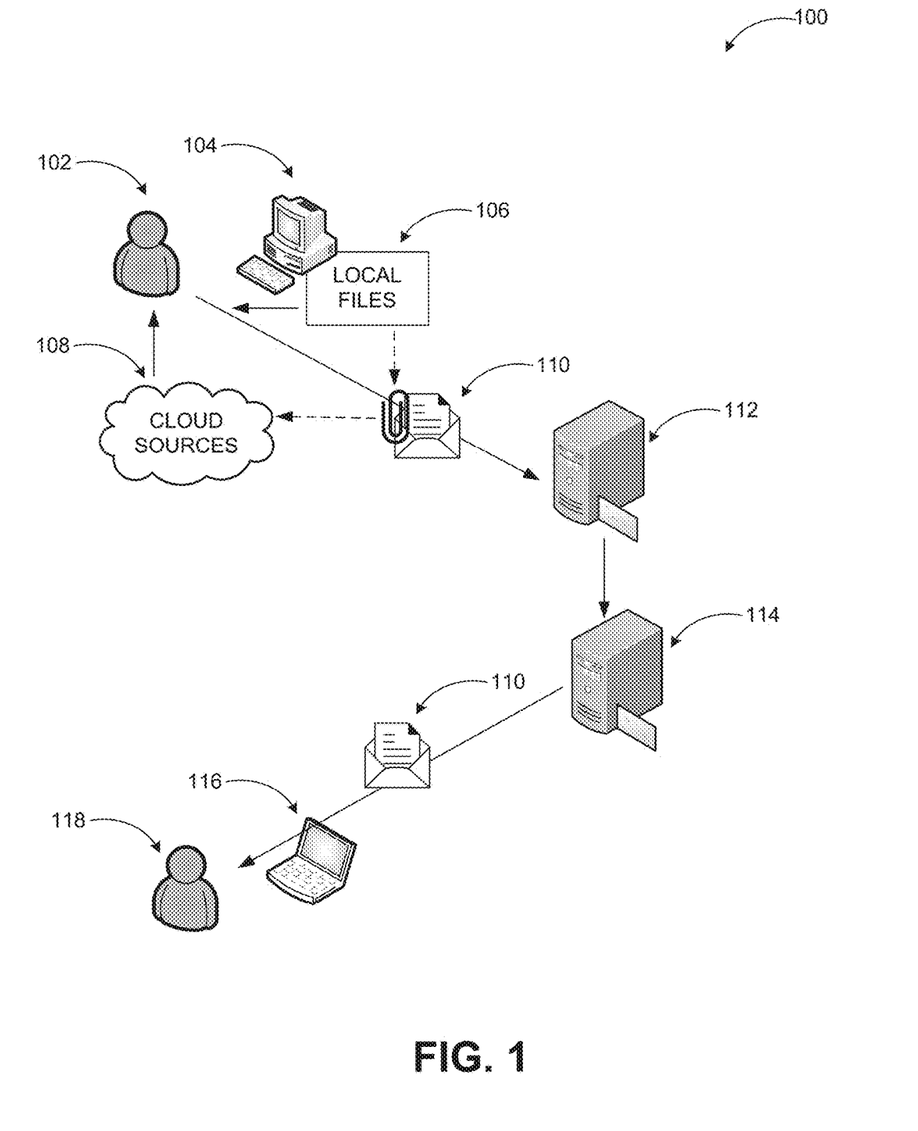
FIG. 1 illustrates an example flow of an email with an attachment, where attachments may be uploaded to a relevant group cloud storage at send time.

FIG. 1 illustrates an example flow of an email with an attachment, where attachments may be uploaded to a relevant group cloud storage at send time.

As shown in diagram 100, a sender 102 may send an email or similar communication to a recipient 118. The exchange of the communication may be facilitated by one or more communication services. For example, a first communication service executed on one or more servers such as server 112 may process the communication and forward to a second communication service executed on one or more servers such as server 114. The sender 102 and the recipient 118 may access their respective communication services via client applications executed on their respective computing devices 104 and 116. The computing devices may be any computing device as described herein. The client applications may be thin client applications (browser based) or thick client applications (locally installed).

In some example scenarios, the sender 102 may include an attachment (such as a file, an object, live metadata, etc.) in the communication 110. The attachment may be from local files 106 or from cloud sources 108. In some cases, the sender 102 may have files or other attachments that have a local version and a cloud version. Thus, the sender 102 may select to attach the local version or the cloud version. In collaborative situations or in cases where attachments include dynamic content, the cloud version may be more readily updated than a local version. From a communication service perspective, the cloud version may be preferred over the local version because of access, network usage, and capacity considerations. Furthermore, maintaining documents and other data associated with a group or theme (e.g., project) at the same cloud storage may enhance collaboration efficiency and security.

In a system according to embodiments, the sender 102 may attach or attempt to attach a local file, for example. The system may prompt the sender to upload the file to a group cloud storage before sending the communication. If the sender if a member of multiple groups, a relevant group cloud storage may be determined based on last use, file type/content, metadata, recipients, which account the sender is in, and comparable factors. The sender 102 may also be provided with options to set permissions for the attachment based on the upload destination selection. In some examples, upload of work documents to personal cloud storage may be prevented. In other examples, the sender 102 may attach a cloud file that may not be stored in a proper group cloud storage. The system may, upon determining the proper group cloud storage for that particular file, suggest to the sender to upload the attached file to the determined group cloud storage.

FIG. 2A through 2D illustrate example user interfaces showing various functionalities that may be provided in conjunction with uploading of attachments to a relevant group cloud storage at send time.

Figure 2A:
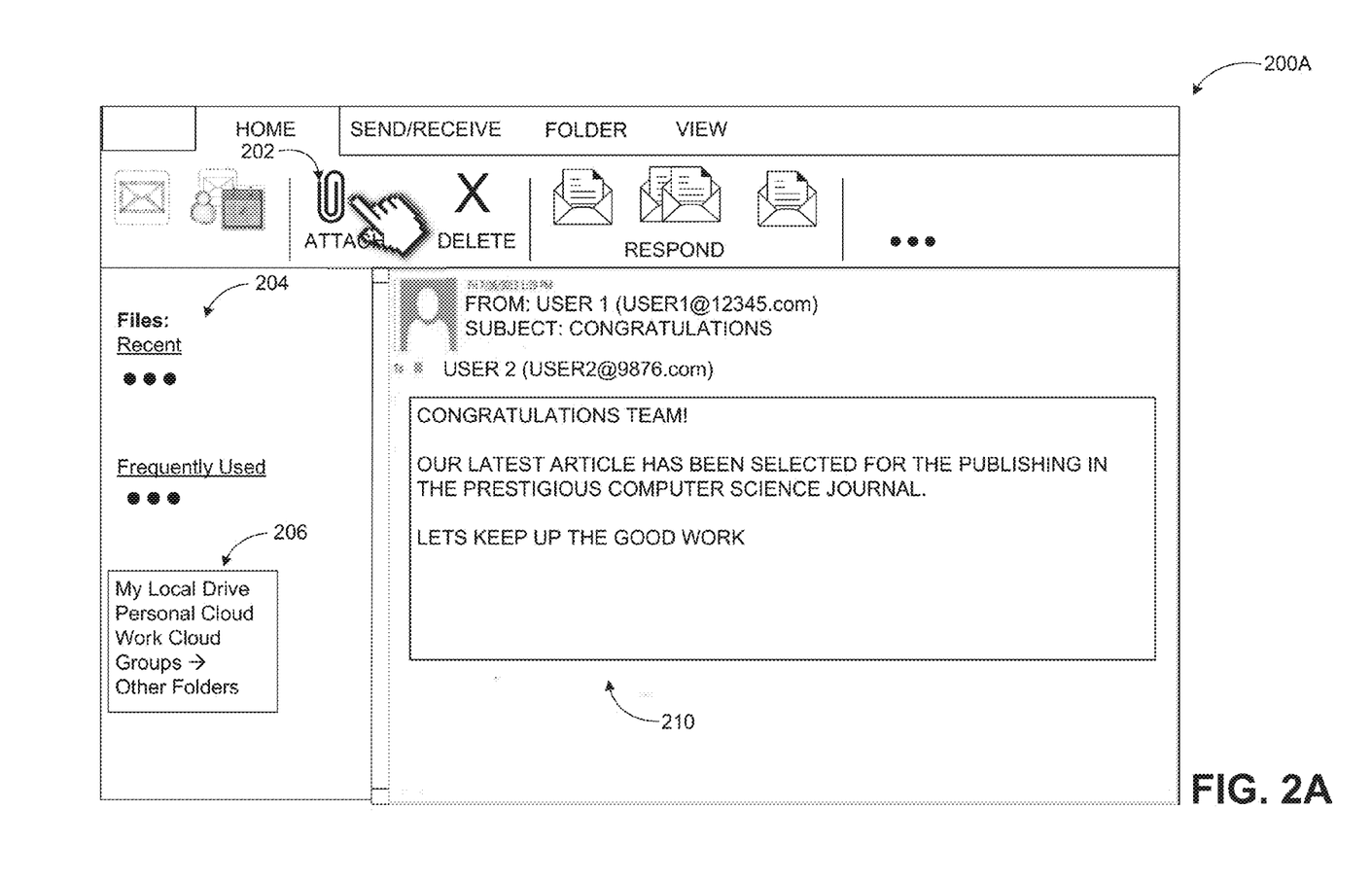
FIG. 2A through 2D illustrate example user interfaces showing various functionalities that may be provided in conjunction with uploading of attachments to a relevant group cloud storage at send time.

In the example user interface 200A, an email with a body 210 is prepared to be sent. The sender may activate an attachment control 202 prompting a selection menu 204 to be presented. The selection menu may allow the sender select among available files. The presented files may be ordered based on recency, frequent use, or other criteria. In some embodiments, another selection menu 206 may be displayed enabling the sender to select among various local files, cloud files, group folders, and other folders. One or more of the selections may be suggested (for example, by highlighting the selection).

The suggested group cloud storage may be determined based on the account the sender is using to send the attachment, sender's credentials, attachment itself (is the file associated with a group), and other factors. If the sender has multiple accounts, he/she may be asked to associate them with different groups and that association may be used in a persistent manner in some examples. Recipients may receive a live version of the attachment, which may be updated in the cloud. In other examples, the system may make the assumption that the sender wishes to collaborate when they attempt to send an attachment while in a group space or select a file associated with a group to send out (e.g., respond to a group thread, etc.).

In other examples, a selection or change of upload destination may be indicated graphically (a folder icon changing to a cloud icon, indication of group, etc.). Operations may be performed by an attachment module or an upload module that may be part of the communication service/application or an independent module, or by the communication service/application itself.

Figure 2B:
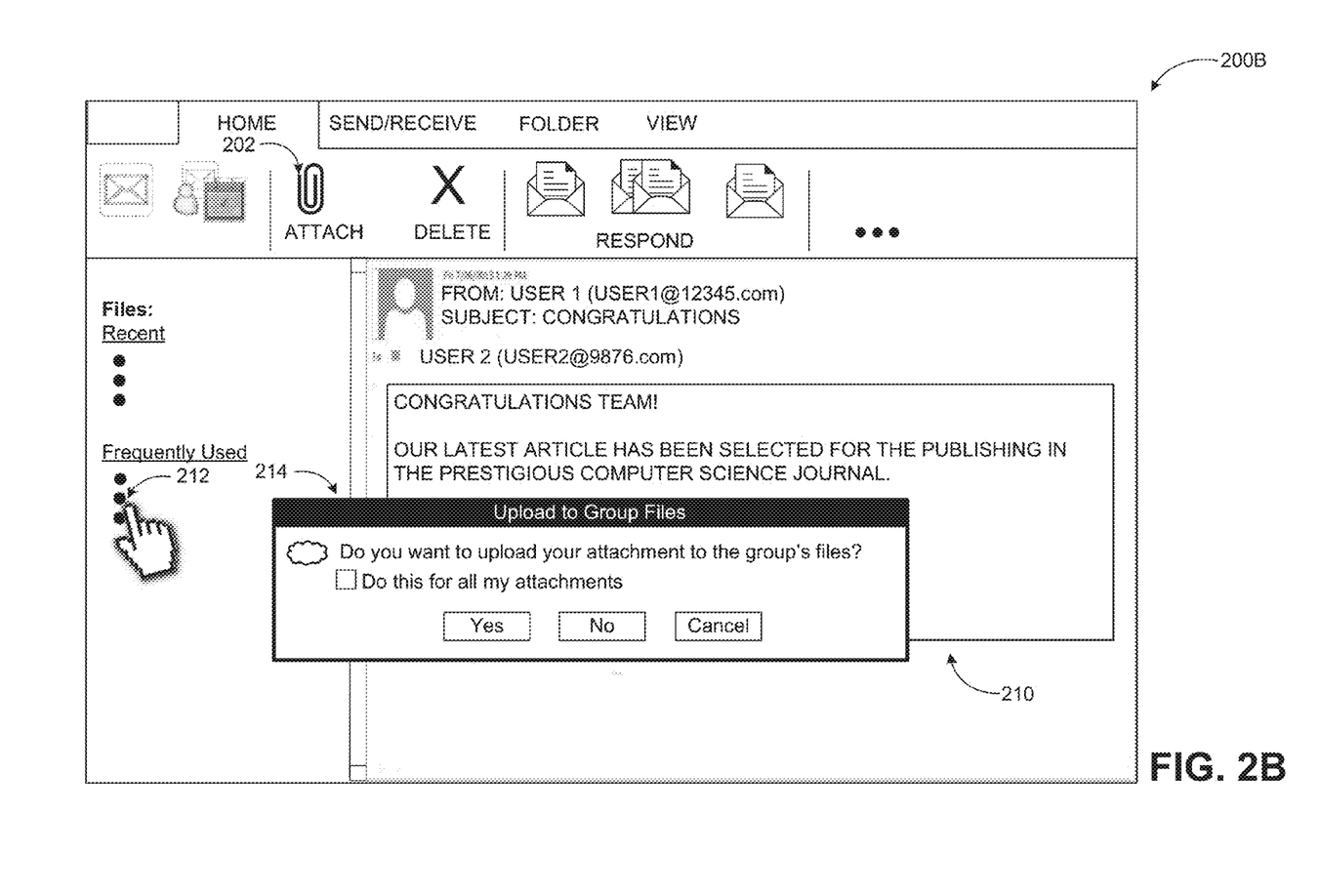

In the example user interface 200B, a first time attachment (212) may trigger a dialog box 214 asking the sender whether the attachment should be saved/uploaded prior to sending. The choice may be persisted for subsequent transmittals for the same attachment, similar attachments, or all attachments.

Figure 2C:
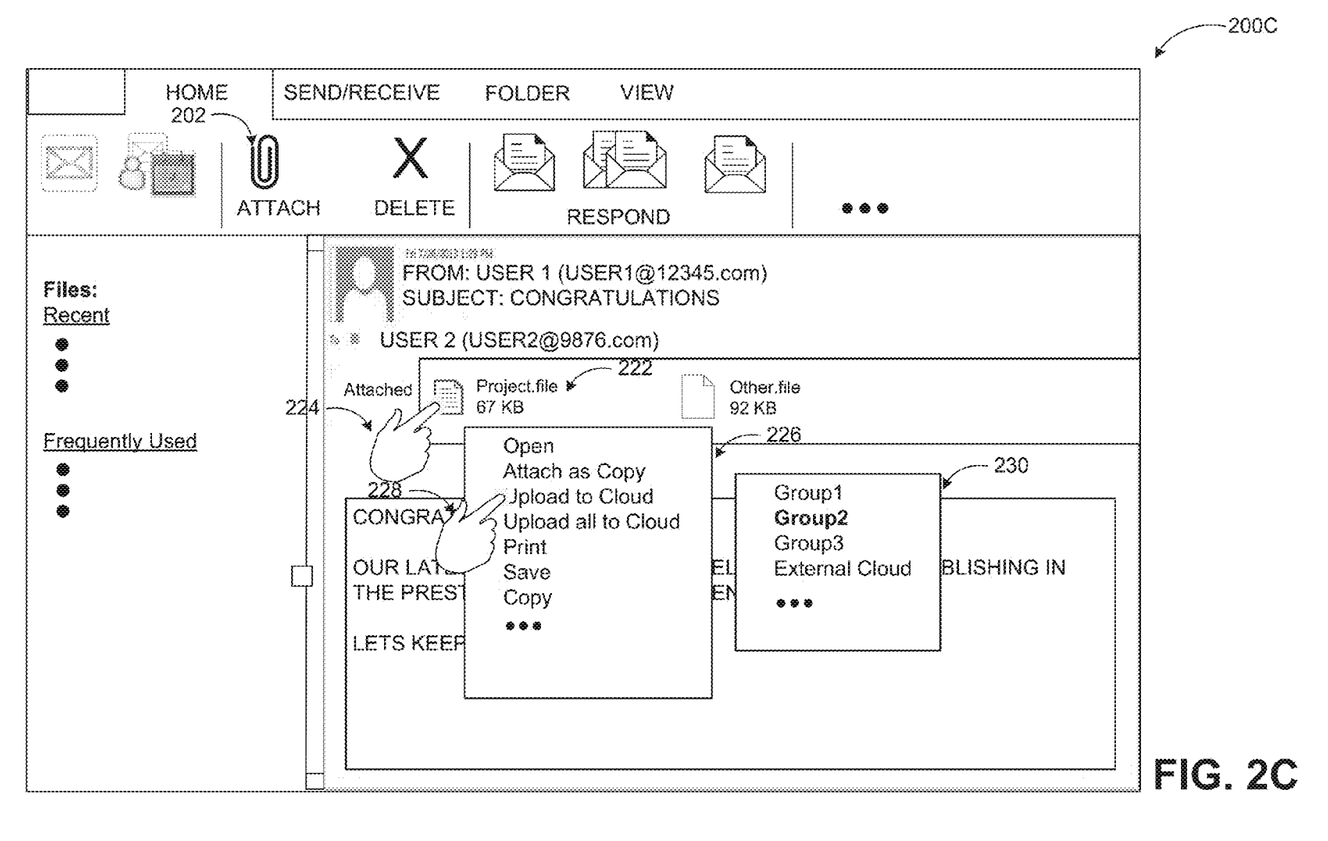

Example user interface 200C shows presentation of a variety of actions in menu 226 upon attachment 224 of a file 222. The file 222 may be attached by the sender through placement in an attachment well, for example. The communication service application may present options to open, print, copy, the attachment along with options to attach as a copy (local version) or upload to a cloud. An option to upload all attachments to the cloud may also be presented. Upon selection of the option to upload to the cloud (228), another menu 230 may be presented providing available group cloud storages. One of the available group cloud storages may be determined as relevant to the attachment by the system based on the factors discussed herein, and emphasized through a textual, graphical, coloring, shading, or highlighting scheme. In the example diagram, Group 2 is shown in bold letters indicating that group has been determined to be suitable for the file 222.

Figure 2D:
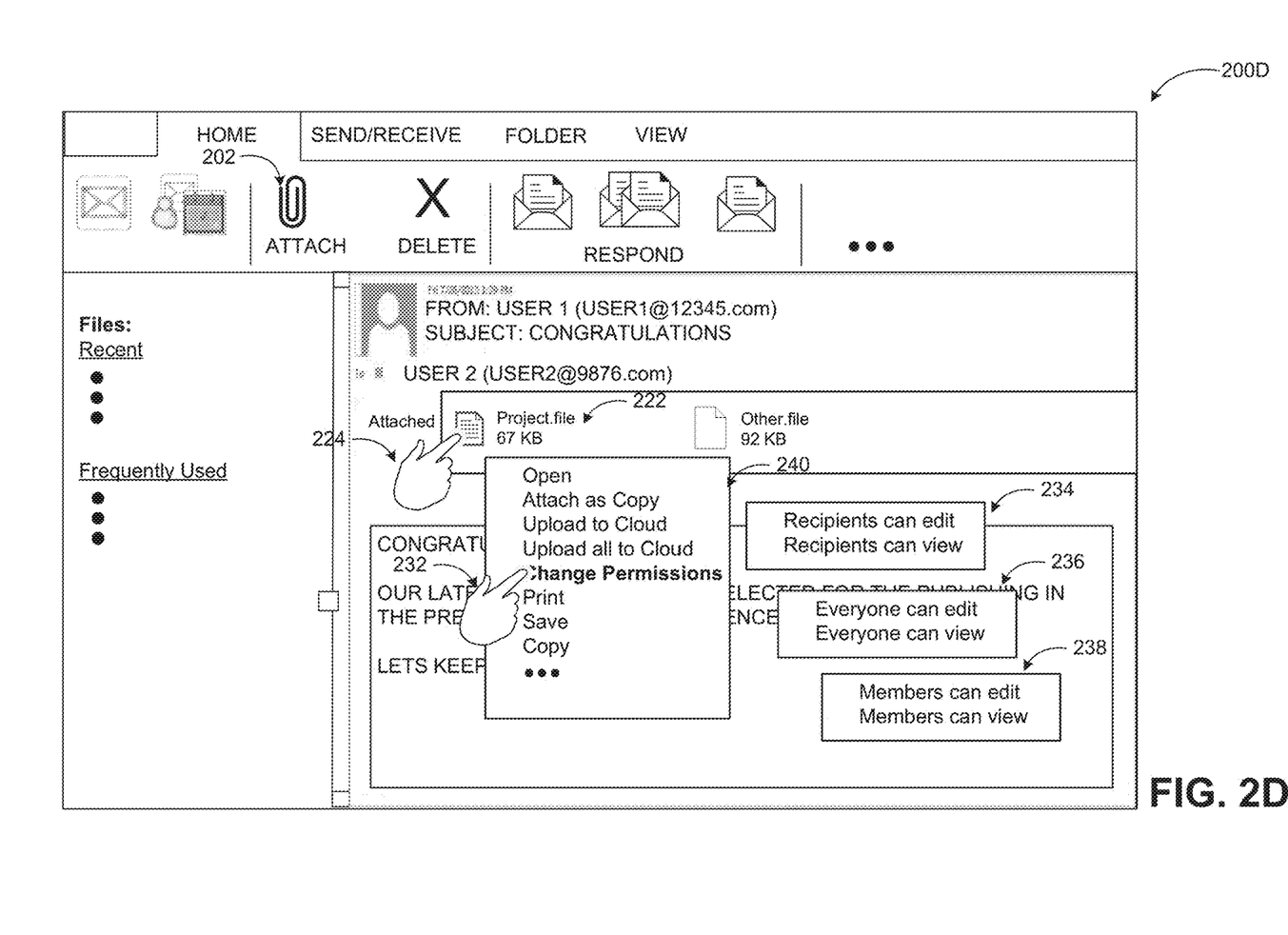

Example user interface 200D shows presentation of a sender with options to set/modify permissions associated with an attachment that is to be uploaded to a group cloud storage. A communication service/application may present among other options, an option to change permissions in menu 240 upon attachment of file 222. Upon selection of the change permissions option (232), a custom permission setting menu may be presented based on the selected upload destination. In the example user interface 200D, three example permission setting menus 234, 236, and 238 are displayed. For example, upon selection of no cloud uploading, the permissions may be based on recipients. If a generic cloud storage is selected, the permission options may be applicable to everyone. If a specific group cloud storage is selected as destination, the permissions may be applicable to members of the group. If a selected group has layered permissions (e.g., management, designers, marketers, etc.), the access to the attachment may be based on the same layers. While edit and view are provided as two example permission levels, embodiments may be implemented with other permission levels or types based on attachment type, upload destination, sender preferences, etc.

Figure 3:
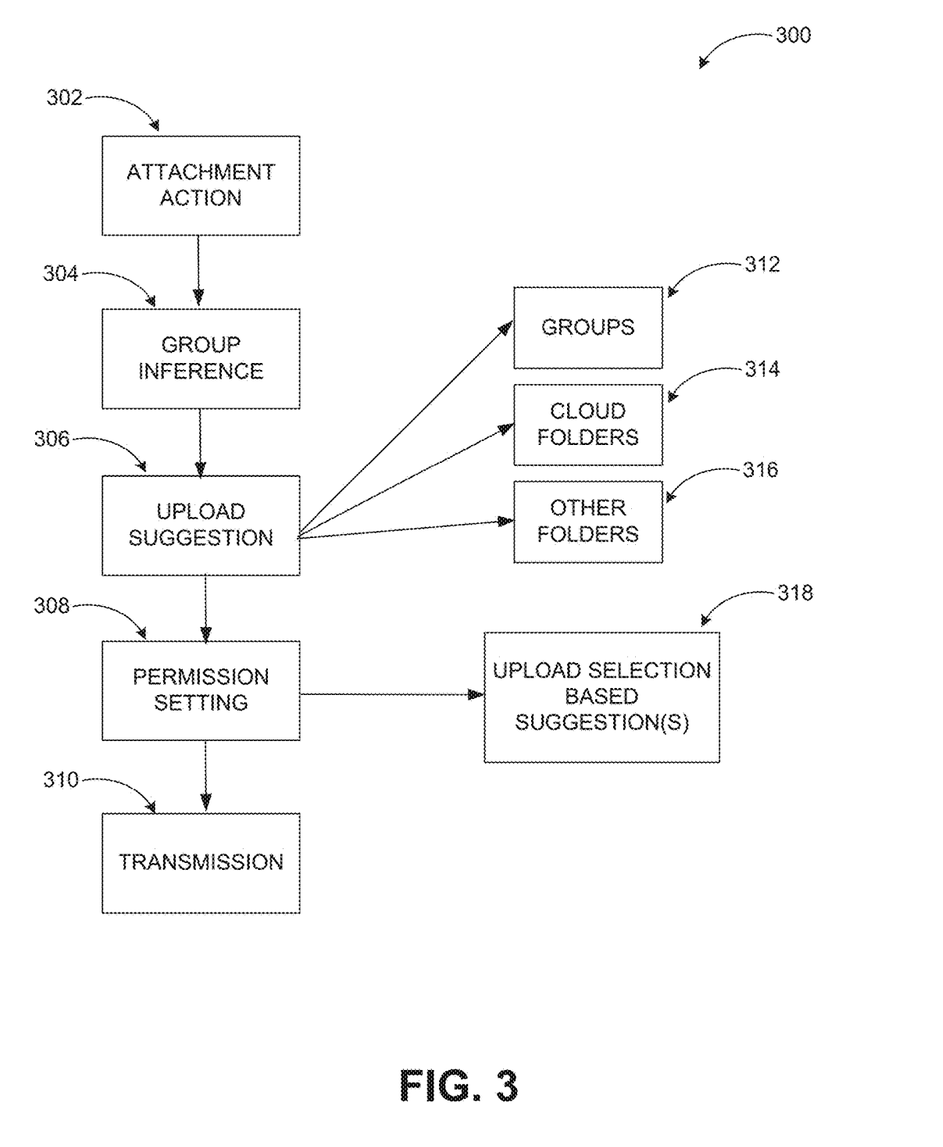
FIG. 3 illustrates an example flow of uploading of attachments to a relevant group cloud storage at send time.

FIG. 3 illustrates an example flow of uploading of attachments to a relevant group cloud storage at send time.

As shown in diagram 300, uploading of attachments to a relevant group cloud storage at send time may begin with an attachment action 302, where a sender may activate an attachment control on a communication application user interface, drag and drop a file onto a communication that is being prepared for transmission, or activate a communication option from a directory (on a selected file) or while viewing a file. The system may determine (e.g. through inference) a suitable group cloud storage 304 next based on the type of attachment, sender, recipients, or other factors discussed herein. The upload suggestion 306 may include one or more group cloud storages 312, other cloud folders 314, or other folders 316 such as a collaboration system's folders, or even sender's local folders. The upload suggestion 306 may be presented using a highlighting, textual, shading, coloring, or graphical scheme to emphasize the suggested destination for the upload.

In some embodiments, the sender may also be presented with options for permission setting 308, which may include setting or modifying permission settings for the attachment based on the selected upload destination 318, among other factors. When the upload selection is completed (and optionally, the permission settings), the communication with the attachment may be transmitted (310).

The examples provided in FIGS. 1 through 3 are illustrated with specific services, devices, applications, modules, module components, and configurations. Embodiments are not limited to environments according to these examples. Uploading of attachments to a relevant group cloud storage at send time may be implemented in environments employing fewer or additional services, devices, applications, modules, module components, and configurations. Furthermore, the example services, devices, applications, modules, module components, and configurations shown in FIG. 1 through 3 may be implemented in a similar manner with other values using the principles described herein.

Figure 4:
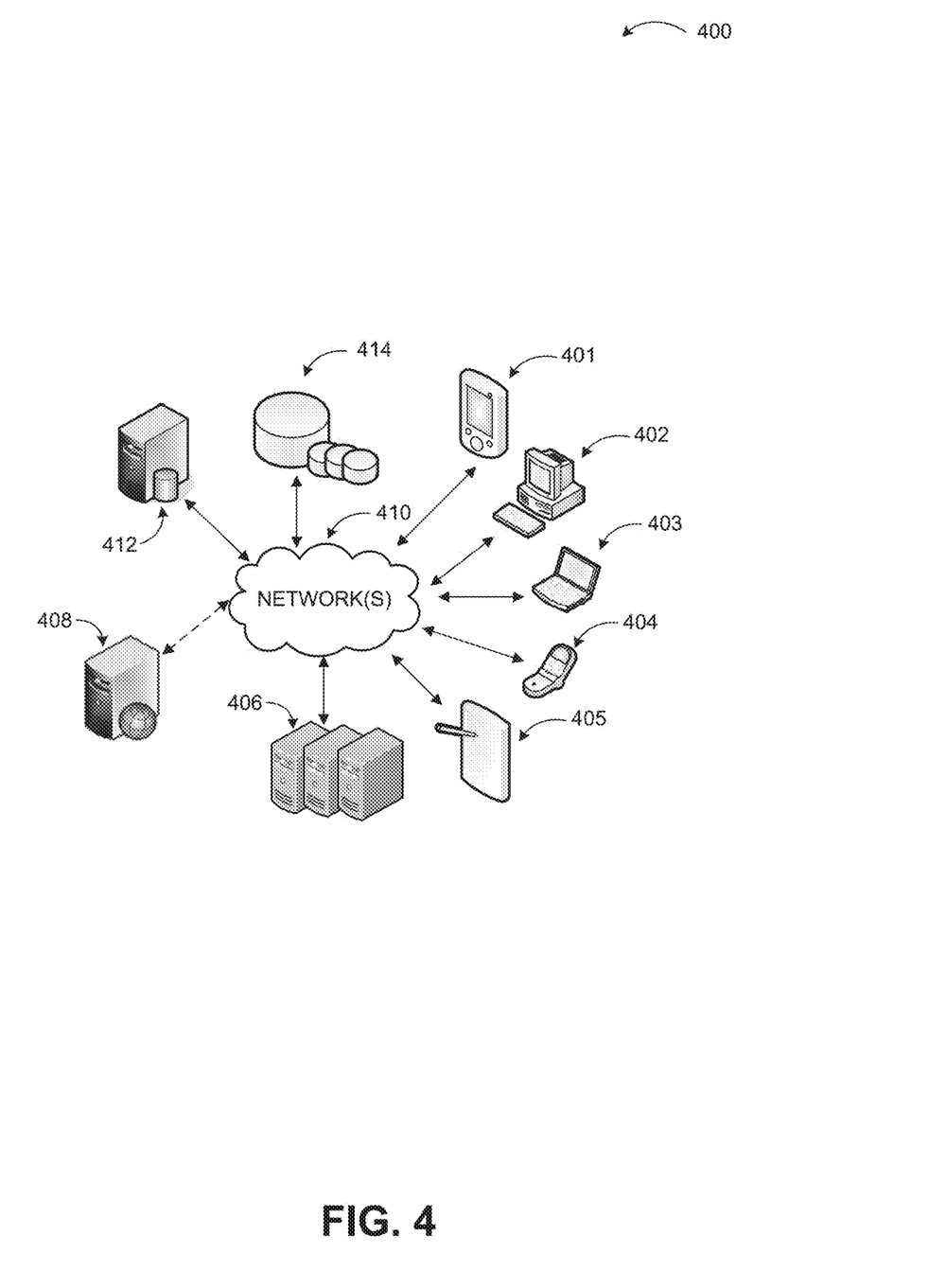
FIG. 4 is a networked environment, where a system according to embodiments may be implemented.

FIG. 4 is a networked environment, where a system according to embodiments may be implemented. As shown in a diagram 400, a communication application and/or service executed on server 406 or 408 may suggest to a user to upload an attachment of an outgoing communication to a group cloud storage upon generation of the communication. Suggestion of group may be based on last use, document type, content, user(s), which account the user is in, and comparable factors. The user (or sender) may also be provided with options to set permissions for the attachment based on the upload destination selection. An example communication application or service may be implemented via software executed over one or more servers 406 or individual server 408. The communication application or service may communicate with client applications on individual computing devices such as a handheld computer 401, a desktop computer 402, a laptop computer 403, a smart phone 404, a tablet computer (or slate), 405 ('client devices') through networks) 410 and control exchange of communications such as mails.

Client devices 401-405 are used to access the functionality provided by the communication service or application. One or more of the servers 406 or server 408 may be used to provide a variety of services associated with providing smart selection of attachment versions as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to uploading of attachments to a relevant group cloud storage at send time. Furthermore, the networked environments discussed in FIG. 4 are for illustration purposes only. Embodiments are not limited to the example applications, modules, or processes.

Figure 5:
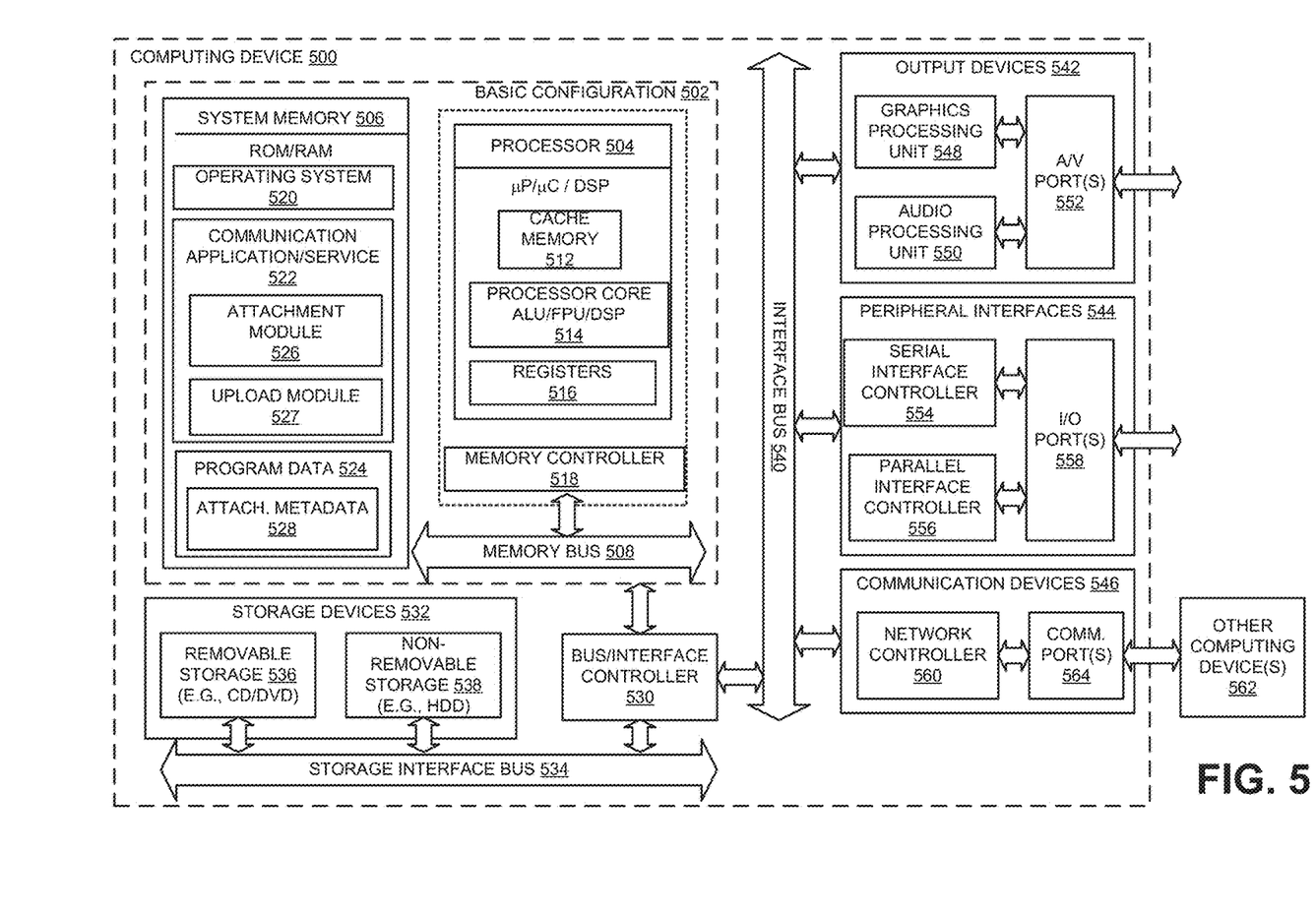
FIG. 5 is a block diagram of an example general purpose computing device, which may be used to provide uploading of attachments to a relevant group cloud storage at send time.

FIG. 5 and the associated discussion are intended to provide a brief, general description of a general purpose computing device, which may be used to provide uploading of attachments to a relevant group cloud storage at send time.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including hut not limited to volatile memory (such as RAM), non-volatile memory (such as ROM, flash memory, etc.) or any combination thereof. The system memory 506 may include an operating system 520, a communication application/service 522, an attachment module 526, an upload module 527, and program data 524. The program data 524 may include, among other data, attachment metadata 528, as disclosed herein. The attachment module 526 and the upload module 527 may, in conjunction with the communication application/service 522, detect attachment of a file to an outgoing communication, suggest to a user to upload the attachment to a group cloud storage upon generation of the outgoing communication. Suggestion of group may be based on last use, document type, content, user(s), which account the user is in, and comparable factors. The user (or sender) may also be provided with options to set permissions for the attachment based on the upload destination selection.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, pen, keyboard, mouse, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media, such as acoustic, radio frequency (RE), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide uploading of attachments to a relevant group cloud storage at send time. These methods can be implemented in any number of ways, including the structures described herein. One s way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 6:
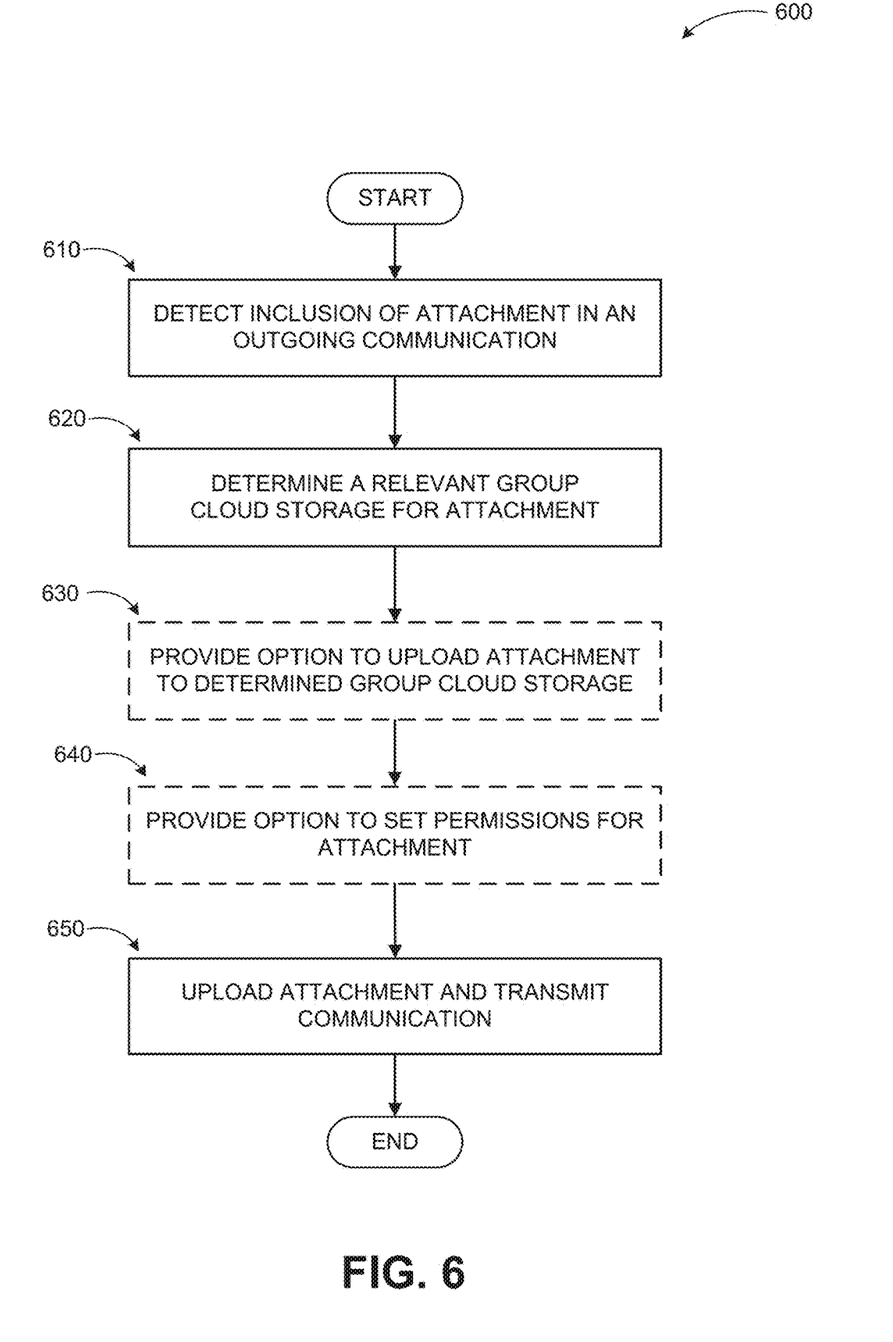
FIG. 6 illustrates a logic flow diagram of a method to provide uploading of attachments to a relevant group cloud storage at send time, according to embodiments.

FIG. 6 illustrates a logic flow diagram for process 600 of a method to provide uploading of attachments to a relevant group cloud storage at send time, according to embodiments. Process 600 may be implemented on a server or other system. An example system may include a communication service that manages various communication modes such as mails. The system may be capable of uploading attachments to a relevant group cloud storage at send time as described herein.

Process 600 begins with operation 610, where inclusion of an attachment in an outgoing communication may be detected. The detection may be based on a sender activating an attachment control, moving a local file to the communication, or comparable actions. At operation 620, a relevant group cloud storage may be determined for the attachment based sender credentials, attachment type/content metadata, activation of the attachment action (e.g., from a file directory), and similar factors.

At optional operation 630, an option may be presented to the sender to upload the attachment to the determined group cloud storage. The sender may also be presented with options to select another storage (e.g., other group cloud storage, personal storage, etc.) or perform the same upload action for all attachments. At optional operation 640, the sender may presented with options to set permissions for the attachment once it is uploaded. The options may be customized based on the destination cloud storage, attachment type, original permissions of the attachment, sender credentials, recipients, etc. At operation 650, the attachment may be uploaded to the selected/suggested group cloud storage with the selected permissions and the outgoing communication may be transmitted with the attachment(s).

The operations included in process 600 are for illustration purposes. Uploading of attachments to a relevant group cloud storage at send time may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to other examples, a means for providing uploading of attachments to a group cloud storage at send time is described. The means may include a means for detecting inclusion of an attachment in an outgoing email; a means for determining a relevant group cloud storage associated with the attachment; a means for presenting a suggestion to a sender based on the determination; a means for uploading the attachment to the determined group cloud storage; and a means for transmitting the outgoing email with the attachment.

According to some examples, a computing device to provide uploading of attachments to a group cloud storage at send time may be described. The computing device may include a memory configured to store instructions and one or more processors coupled to the memory, the one or more processors configured to execute, in conjunction with the instructions stored in the memory, a communication service. The communication service may include a communication exchange module configured to facilitate exchange of communications arriving between senders and recipients and transmit an outgoing communication with an attachment. The communication service may also include an attachment module configured to detect inclusion of the attachment in the outgoing communication and an upload module configured to determine a relevant group cloud storage associated with the attachment, present a suggestion to a sender based on the determination, and upload the attachment to the determined group cloud storage.

According to other examples, the upload module may be configured to determine the relevant group cloud storage associated with the attachment based on one of a sender input and an inference. The inference may be based on one or more of an account used by the sender to send the outgoing communication, one or more credentials of the sender, a last use, an attachment type, and attachment content, attachment metadata, and one or more recipients of the outgoing communication. The upload module may be further configured to present a dialog box with the suggestion upon first time inclusion of the attachment in an outgoing communication; and persist a selection of the sender for subsequent transmissions of one of the attachment, attachments with at least one attribute that may be the same as the attachment, and all attachments.

According to further examples, the attachment module may be configured to detect the inclusion of the attachment in the outgoing communication based on one of an activation of an attachment control, a drag-and-drop of the attachment onto the outgoing communication, and generation of the outgoing communication in conjunction with the attachment. Generation of the outgoing communication in conjunction with the attachment may include activation of the communication service from a folder where the attachment may be selected and activation of the communication service from an application that may be processing the attachment.

According to yet other examples, the upload module may be configured to make an assumption that the sender wishes to collaborate when the sender attempts to send the attachment while in a group space or the sender selects a file associated with a group to send. The attachment may be one of a file and an object. The upload module may be configured to present the suggestion to the sender employing one or more of a textual scheme, a graphical scheme, a highlighting scheme, a coloring scheme, and a shading scheme. The attachment module may be configured to prevent upload of a work-related attachment to a personal cloud storage. The outgoing communication may be one of an email, an instant message, an online conference recording, a data sharing session, and an application sharing session.

According to other examples, a method executed on a computing device to provide uploading of attachments to a group cloud storage at send time is described. The method may include detecting inclusion of an attachment in an outgoing email; determining a relevant group cloud storage associated with the attachment; presenting a suggestion to a sender based on the determination; uploading the attachment to the determined group cloud storage; and transmitting the outgoing email with the attachment.

According to some examples, determining the relevant group cloud storage associated with the attachment may include inferring the relevant group cloud storage based on one or more of an account used by the sender to send the outgoing communication, one or more credentials of the sender, a last use, an attachment type, and attachment content, attachment metadata, and one or more recipients of the outgoing communication. The method may further include presenting one or more options to set or modify permissions associated with the attachment to the sender, where the options are based on one or more of the determined group cloud storage, a sender attribute, one or more recipient attributes, and one or more attachment attributes.

According to other examples, the method may also include if all members of a group associated with the determined group cloud storage have same permission levels, setting the same permission levels for the attachment automatically; and if members of the group associated with the determined group cloud storage have layered permission levels, setting the permission levels for the attachment based on the layered permission levels. The one or more attachment attributes may include one or more of an attachment type, an attachment content, and attachment metadata. The method may further include determining the attachment to be stored in a first group cloud storage; determining the relevant group cloud storage to be a second group cloud storage; and uploading the attachment to the second group cloud storage. The method may also include indicating a change in a storage location of the attachment employing one or more of a textual scheme, a graphical scheme, a highlighting scheme, a coloring scheme, and a shading scheme.

According to further examples, a computer readable memory device with instructions stored thereon to provide uploading of attachments to a group cloud storage at send time is described. The instructions may include detecting inclusion of an attachment in an outgoing email; inferring a relevant group cloud storage based on one or more of an account used by the sender to send the outgoing communication, one or more credentials of the sender, a last use, an attachment type, and attachment content, attachment metadata, and one or more recipients of the outgoing communication; presenting a suggestion to a sender based on the inferred relevant group cloud storage; uploading the attachment to the suggested group cloud storage; and transmitting the outgoing email with the attachment.

According to yet other examples, the instructions may further include detecting the inclusion of the attachment in the outgoing email based on one of an activation of an attachment control, a drag-and-drop of the attachment onto the outgoing email, and generation of the outgoing email in conjunction with the attachment; presenting a dialog box with the suggestion upon first time inclusion of the attachment in an outgoing email; and persisting a selection of the sender for subsequent transmissions of one of the attachment, attachments with at least one attribute that may be the same as the attachment, and all attachments.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide uploading of attachments to a group cloud storage at send time, the computing device comprising:
   a memory configured to store instructions;
   one or more processors coupled to the memory, the one or more processors configured to execute, in conjunction with the instructions stored in the memory, a communication service, wherein the one or more processors are configured to:
   detect inclusion of an attachment in the outgoing communication;
   determine a relevant group cloud storage for the attachment through inference based on one or more of an account used by a sender to send the outgoing communication, a credential of the sender, a last use, attachment content, and attachment metadata;
   present a suggestion to the sender to store the attachment at the relevant group cloud storage;
   upon detecting an acceptance of the suggestion, upload the attachment to the relevant group cloud storage; and
   transmit the outgoing communication with a live version of the attachment stored in the relevant group cloud storage, wherein the live version of the attachment reflects a latest update to the attachment.

2. The computing device of claim 1, wherein the one or more processors are further configured to determine the relevant group cloud storage associated with the attachment based on a sender input.

3. The computing device of claim 1, wherein the one or more processors are further configured to:
   present a dialog box with the suggestion upon first time inclusion of the attachment in an outgoing communication; and
   present a selection of the sender for subsequent transmission of one of the attachment, attachments with at least one attribute that is the same as the attachment, and all attachments.

4. The computing device of claim 1, wherein the one or more processors are configured to detect the inclusion of the attachment in the outgoing communication based on one of an activation of an attachment control, a drag-and-drop of the attachment onto the outgoing communication, and generation of the outgoing communication in conjunction with the attachment.

5. The computing device of claim 4, wherein generation of the outgoing communication in conjunction with the attachment includes activation of the communication service from a folder where the attachment is selected and activation of the communication service from an application that is processing the attachment.

6. The computing device of claim 1, wherein the one or more processors are further configured to infer that the sender wishes to collaborate based on an attempt by the sender to send the attachment while in a group space or the sender selects a file associated with a group to send.

7. The computing device of claim 1, wherein the attachment is one of a file and an object.

8. The computing device of claim 1, wherein the one or more processors are configured to present the suggestion to the sender employing one or more of a textual scheme, a graphical scheme, a highlighting scheme, a coloring scheme, and a shading scheme.

9. The computing device of claim 1, wherein the outgoing communication is one of an email, an instant message, an online conference recording, a data sharing session, and an application sharing session.

10. A method executed on a computing device to provide uploading of attachments to a group cloud storage at send time, the method comprising:
  detecting inclusion of an attachment in an outgoing mail;
  determining a relevant group cloud storage for the attachment through inference based on one or more of an account used by a sender to send an outgoing communication, a credential of the sender, a last use, attachment content, and attachment metadata;
  presenting a suggestion to the sender to store the attachment at the relevant group cloud storage;
  upon detecting an acceptance of the suggestion, uploading the attachment to the relevant group cloud storage; and
  transmitting the outgoing email with a live version of the attachment stored in the relevant group cloud storage, wherein the live version of the attachment reflects a latest update to the attachment.

11. The method of claim 10, further comprising:
  presenting one or more options to set or modify permissions associated with the attachment to the sender, wherein the options are based on one or more of the relevant group cloud storage, a sender attribute, one or more recipient attributes, and one or more attachment attributes.

12. The method of claim 11, further comprising:
  if all members of a group associated with the relevant group cloud storage have same permission levels, setting the same permission levels for the attachment automatically; and
  if members of the group associated with the relevant group cloud storage have layered permission levels, setting the permission levels for the attachment based on the layered permission levels.

13. The method of claim 10, further comprising:
  determining the attachment to be stored in a first group cloud storage;
  determining the relevant group cloud storage to be a second group cloud storage; and
  uploading the attachment to the second group cloud storage.

14. The method of claim 13, further comprising:
  indicating a change in a storage location of the attachment employing one or more of a textual scheme, a graphical scheme, a highlighting scheme, a coloring scheme, and a shading scheme.

15. A computer readable memory device with instructions stored thereon to provide uploading of attachments to a group cloud storage at send time, the instructions comprising:
  detecting inclusion of an attachment in an outgoing email;
  determining a relevant group cloud storage for the attachment through inference based on one or more of an account used by a sender to send an outgoing communication a credential of sender, a last use, attachment content, attachment metadata, and one or more recipients of the outgoing communication;
  presenting a suggestion to the sender based on the relevant group cloud storage;
  upon detecting an acceptance of the suggestion, uploading the attachment to the relevant group cloud storage; and
  transmitting the outgoing email with a live version of the attachment stored in the relevant group cloud storage, wherein the live version of the attachment reflects a latest update to the attachment.

16. The computer readable memory device of claim 15, wherein the instructions further comprise:
  detecting the inclusion of the attachment in the outgoing email based on one of an activation of an attachment control, a drag-and-drop of the attachment onto the outgoing email, and generation of the outgoing email in conjunction with the attachment;
  presenting a dialog box with the suggestion upon first time inclusion of the attachment in an outgoing email;
  persisting a selection of the sender for subsequent transmission of one of the attachment, attachments with at least one attribute that is the same as the attachment, and all attachments.

* * * * *